(12) United States Patent
Jensen et al.

(10) Patent No.: US 12,304,742 B2
(45) Date of Patent: May 20, 2025

(54) VIBRATING CONVEYOR

(71) Applicant: B&R INDUSTRIAL AUTOMATION GMBH, Eggelsberg (AT)

(72) Inventors: Sverre Faureholm Jensen, Odense S (DK); Thomas Norby, Odense S (DK); Mike Gornitzka, Odense S (DK)

(73) Assignee: ABB SCHWEIZ AG, Baden (CH)

( * ) Notice: Subject to any disclaimer, the term of this patent is extended or adjusted under 35 U.S.C. 154(b) by 267 days.

(21) Appl. No.: 17/500,247

(22) Filed: Oct. 13, 2021

(65) Prior Publication Data

US 2022/0112032 A1    Apr. 14, 2022

(30) Foreign Application Priority Data

Oct. 14, 2020    (EP) ..................... 20201834

(51) Int. Cl.
*B65G 27/16* (2006.01)
*H02N 2/04* (2006.01)
(Continued)

(52) U.S. Cl.
CPC ............. *B65G 27/16* (2013.01); *H02N 2/043* (2013.01); *H02N 2/065* (2013.01); *H02P 25/032* (2016.02)

(58) Field of Classification Search
CPC .............. B65G 27/16; B65G 27/32; B65G 2812/0304; H02N 2/043; H02N 2/065; H02P 25/032
See application file for complete search history.

(56) References Cited

U.S. PATENT DOCUMENTS 5,780,780 A    7/1998  Ahmed
7,965,001 B2 *  6/2011  Aoyama .................. B06B 1/04
                                                  310/36
(Continued)

FOREIGN PATENT DOCUMENTS

CN    108249109 B  * 10/2021  ............... B06B 1/02
DE    4142398 A1  *  6/1993  ............. B65G 27/32
(Continued)

OTHER PUBLICATIONS

Europe Search Report conducted in counterpart Europe Application No. 20201834.7 (Mar. 19, 2021).

*Primary Examiner* — Gene O Crawford
*Assistant Examiner* — Abby A Jorgensen
(74) *Attorney, Agent, or Firm* — GREENBLUM & BERNSTEIN, P.L.C.

(57) ABSTRACT

For tuning a vibrating conveyor having an electric vibrator that drives a vibration element connected to a conveying unit of the vibrating conveyor for oscillating the conveying unit to a mechanical resonance frequency $f_R$ of the vibrating conveyor, an electric drive unit varies the frequency $f_v$ of a AC drive voltage ($u_v$) in a given frequency range, measures a current consumption of the electric vibrator unit for different applied frequencies $f_v$ of the AC drive voltage ($u_v$) and using the frequency $f_v$ with the lowest current consumption of the electric vibrator unit as frequency $f_v$ of the AC drive voltage ($u_v$) for operating the vibrating conveyor.

10 Claims, 2 Drawing Sheets

(51) Int. Cl.
*H02N 2/06* (2006.01)
*H02P 25/032* (2016.01)

(56) References Cited

U.S. PATENT DOCUMENTS

| | | | |
|---|---|---|---|
| 11,820,602 B2 * | 11/2023 | Ludescher | B65G 27/26 |
| 2021/0387810 A1 * | 12/2021 | Svejkovsky | B65G 27/24 |

FOREIGN PATENT DOCUMENTS

| | | | | |
|---|---|---|---|---|
| KR | 2019044488 A * | 4/2019 | | B06B 1/0215 |
| WO | WO-9623248 A1 * | 8/1996 | | B65G 27/32 |
| WO | WO-2006090608 A1 * | 8/2006 | | B65G 27/02 |
| WO | 2007/147419 | 12/2007 | | |
| WO | WO-2007147419 A1 * | 12/2007 | | B06B 1/0253 |
| WO | WO-2009144836 A1 * | 12/2009 | | B06B 1/0238 |
| WO | 2018/069819 | 4/2018 | | |
| WO | WO-2018069819 A1 * | 4/2018 | | B65G 27/24 |

* cited by examiner

VIBRATING CONVEYOR

CROSS-REFERENCE TO RELATED APPLICATIONS

This application claims priority under 35 U.S.C. § 119(a) of Europe Application No. EP 20201834.7 filed Oct. 14, 2020, the disclosure of which is expressly incorporated by reference herein in its entirety.

BACKGROUND OF THE INVENTION

1. Field of the Invention

Embodiments are directed to a vibrating conveyor having an electric vibrator unit that drives a vibration element connected to a conveying unit of the vibrating conveyor for oscillating the conveying unit and further having an electric drive unit that supplies the electric vibrator unit with an AC drive voltage with frequency $f_v$ for causing the conveying unit to oscillate. The frequency $f_v$ of the AC drive voltage is tuned to a mechanical resonance frequency $f_R$ of the vibrating conveyor. Embodiments also pertains a method for operating such a vibrating conveyor.

2. Discussion of Background Information

Conveyor systems are common machines in production, handling or assembly plants for moving goods from one location to another. Conveyor systems are commonly used in many industries for conveying a wide variety of parts and materials. For conveying bulk materials vibration conveyors are often used.

A vibrating conveyor is a machine with a solid conveying unit that oscillates linearly or rotary. The goods to be conveyed are put on the oscillating unit and are moved in accordance to the oscillations of the conveying unit. The oscillating conveying unit is driven by at least one electromagnetic vibrator that is connected to the conveying unit and transfers the oscillating movement of a vibration element of the vibrator to the conveying unit. To support the oscillation, also at least one spring can be connected to the conveying unit.

There are different embodiments of an electromagnetic vibrator conceivable. The vibrator could be designed as electric coil with a core or a magnetic element as vibration element that is moving in response to the electromagnetic field produced by the coil. When an oscillating voltage, e.g. a sine voltage of a certain frequency, is applied to the coil, the vibration element oscillates with the same frequency.

Also, a piezo actuator, especially an amplified piezo actuator, could be used as vibrator. Applying an electric voltage to the piezo actuator causes a stroke of the piezoelectric element. Amplified piezo actuators scale up the very small movements (elongations) of the piezoelectric element to large movements, usually by mechanical transmission. In doing so, the stroke of the piezoelectric element is converted into a larger stroke. The stroke of the amplified piezo actuator then follows the stroke of the piezoelectric element. Such piezo actuators are sufficiently well known and are available in various embodiments.

Also, other types of electromagnetic vibrators are possible. All electromagnetic actuators have in common that an oscillating voltage or current applied to the vibrator as power supply is converted to a vibrating movement of the vibration element of the vibrator. Usually, but not necessarily, the frequency of the vibration element corresponds to the frequency of the oscillating supply voltage or current.

It is advantageous to operate the vibrator at or near the mechanical resonance frequency of the oscillating system, i.e. the vibration element and the vibrating conveying unit, to achieve great oscillation amplitudes with small movements of the vibration element and with minimum energy of the power supply. For that the frequency of the vibration element (that drives the oscillation) must match or be close to the resonance frequency of the oscillating system.

For exciting the vibrating conveyor with its mechanical resonance frequency either the vibrator can be tuned mechanically to a specific frequency, or the drive system can adapt to the mechanical resonance frequency.

It is possible to use a given power grid, e.g., an AC mains power supply with 50 Hz or 60 Hz, as power supply for the vibrator. In such implementation, the frequency is derived from the power grid and the amplitude of the vibrations can be controlled by controlling the amplitude of the supply voltage, e.g. with phase shift control. For resonance, the mechanical resonance frequency has to be tuned to the excitation frequency (frequency derived from the supply voltage). This is usually done manually by means of mechanical adjustors in the oscillating system, e.g. by changing mechanical stiffnesses (damping) or characteristics of springs. This is, however, inconvenient and requires a trained operator. Furthermore, the mechanical resonance frequency typically changes during operation of the vibrating conveyor. The mechanical resonance frequency depends on the conveyed goods (size, weight, shape), on the mass of the goods on the conveying surface (filling level, number of goods), on mechanical wear, and so on. Therefore, a permanent manual adjustment of the mechanical resonance frequency would be required to optimally operate the vibrating conveyor over time.

To avoid manual adjustment of the mechanical resonance frequency, controlled electromagnetic vibrators have already been suggested. Such controlled electromagnetic vibrators allow to vary the frequency of the supply voltage or current, and by doing so also to vary the frequency of the vibration element. Hence, it is possible to match the frequency of the vibration element to the varying mechanical resonance frequency of the oscillating system. Such a controlled electromagnetic vibrator is known from WO 2018/069819 A1, the disclosure of which is expressly incorporated by reference herein in its entirety. In WO 2018/069819 A1 the phase difference between the oscillation of the conveying surface and the electric supply voltage is used for controlling the frequency of the electric supply voltage. Resonance is reached when the phase difference is zero. The oscillation of the conveying surface is detected using an acceleration sensor. This means that an additional acceleration sensor is needed at the vibrating conveyor. The sensor output is processed in a control unit according to a certain control algorithm. Consequently, the vibrating conveyor has to be equipped with special electronics with interfaces to overlaid control units (e.g. for controlling the throughput or conveying rate of the vibrating conveyor) and a machine builder who wants to use the vibrating conveyor in its machines is dependent on the vibrator manufacturers as the special electronics must be integrated in the machine control.

SUMMARY

Therefore, embodiments are directed to a vibrating conveyor that can be used more flexibly and easily.

With an automatic (discrete or analogue) frequency sweep, the natural resonance frequency of the vibrating conveyor with its oscillating mechanical parts is identified which allows to excite the vibrating conveyor with the mechanical resonance frequency for its operation. The complete technology may be embedded into an electric drive unit that may be used with different vibrating conveyors. No external special electronics or sensors is required anymore. The machine builders are not depending on the manufacturer of the vibrating conveyor anymore.

For adjusting the vibrating conveyor to a drifting resonance frequency, the system can easily be re-tuned regularly or if needed. For re-tuning, the frequency sweep and measuring the current consumption can be repeated. It is also possible to change the frequency of the supply voltage by a given frequency increment.

Embodiments are directed to a method for controlling the oscillation of a vibrating conveyor, the vibrating conveyor including a vibration element, an oscillation conveyor coupled to the vibration element, and an electric vibrator arranged to vibrate the vibration element. The method includes supplying the electric vibrator with an AC drive voltage having an initial frequency; tuning the initial frequency of the AC drive voltage to a mechanical resonance frequency of the vibrating conveyor; wherein the tuning of the initial frequency of the AC drive voltage to the mechanical resonance frequency of the vibrating conveyor comprises: varying the initial frequency of the AC drive voltage in a given frequency range, measuring a current consumption of the electric vibrator for different frequencies within the given frequency range, and using one of the different frequencies within the given frequency range with the lowest current consumption of the electric vibrator as a tuned frequency of the AC drive voltage for operating the vibrating conveyor.

According to embodiments, the given frequency range can include a number of given frequency increments.

In accordance with further embodiments, the method can include initiating a re-tuning the tuned frequency of the AC drive voltage one of regularly or when a deviation of an actual AC drive current and a given expected current flow exceeds a given admissible current difference. Further, for re-tuning of the tuned frequency of the AC drive voltage, the method can include varying the tuned frequency of the AC drive voltage in the given frequency range, measuring the current consumption of the electric vibrator for the different frequencies within the given frequency range, and using one of the frequencies within the given frequency range with the lowest current consumption of the electric vibrator as a re-tuned frequency of the AC drive voltage for operating the vibrating conveyor. Moreover, the given frequency range can include a number of given frequency increments, and the re-tuning of the frequency of the AC drive voltage can be changed by one of the given frequency increments.

Embodiments are directed to a vibrating conveyor that includes a vibration element; a conveying unit coupled to the vibration element; an electric vibrator arranged to drive the vibration element, which oscillates the conveying unit; and an electric drive, which comprises a current measurement sensor, arranged to supply the electric vibrator with an AC drive voltage with a frequency tuned to a mechanical resonance frequency for oscillating the conveying unit. The electric drive is structured to supply the AC drive voltage with an initial frequency that is tunable to the mechanical resonance frequency of the vibrating conveyor by varying the initial frequency in a given frequency range, to measure a current consumption of the electric vibrator with the current measurement sensor for the different frequencies in the given frequency range, and to use, as a tuned frequency of the AC drive voltage, one of the different frequencies with the lowest current consumption of the electric vibrator unit for operating the vibrating conveyor.

According to embodiments, the electric vibrator may include an electric coil. Further, the vibration element can include one of a moving core of the electric coil or a magnetic element interacting with the electric coil.

In accordance with still yet other embodiments, the electric vibrator include an amplified piezoelectric actuator with a piezoelectric element and a mechanical transmission. Further, the mechanical transmission is arranged as the vibration element and the piezoelectric element is arranged as electric vibrator.

Other exemplary embodiments and advantages of the present invention may be ascertained by reviewing the present disclosure and the accompanying drawing.

BRIEF DESCRIPTION OF THE DRAWINGS

The present invention is described in greater detail in the following with reference to FIGS. 1 to 4, which show exemplary, schematic and non-limiting advantageous embodiments of the invention. In the drawings.

BRIEF DESCRIPTION OF THE DRAWINGS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
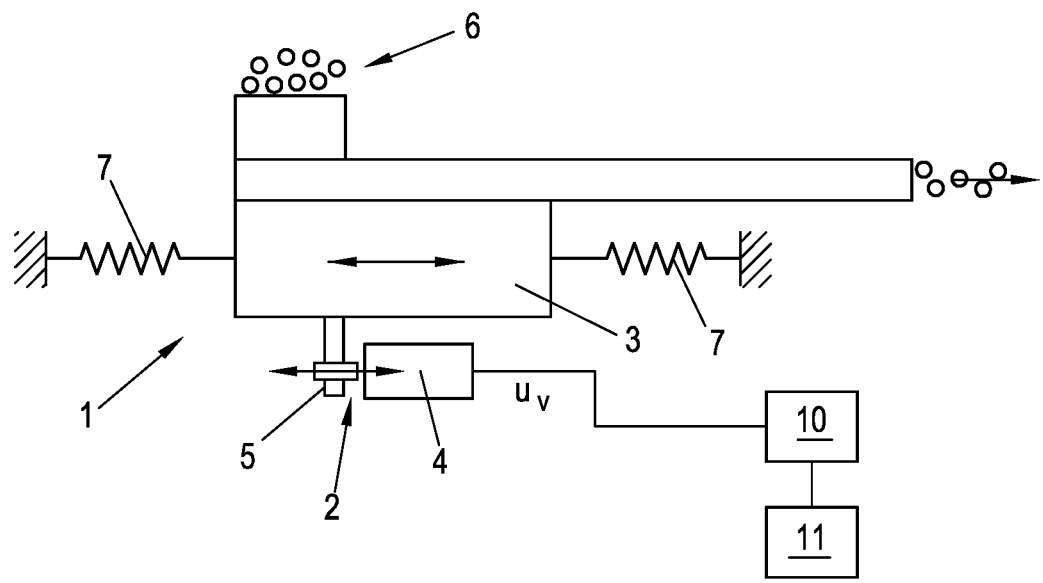
FIGS. 1 and 2 show possible embodiments of a vibrating conveyor.
Figure 2:
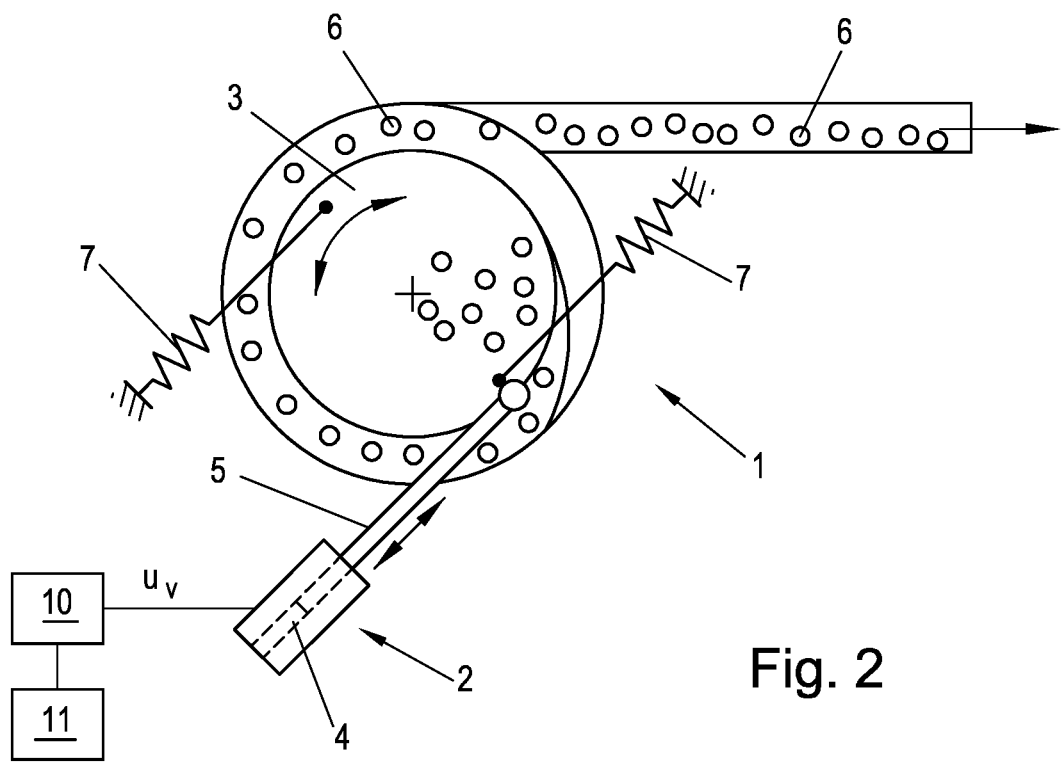

FIG. 1 and FIG. 2 show exemplarily embodiments of a vibrating conveyor 1, in FIG. 1 a linear vibrating conveyor and in FIG. 2 a rotary vibrating conveyor. The direction of the oscillations (indicated by the double arrows) is however irrelevant for the invention. The vibrating conveyor 1 comprises a vibrator 2, that is connected to a conveying unit 3 and that drives the conveying unit 3. On the conveying unit 3, goods 6 to be conveyed, e.g. bulk material as indication in the drawings, are arranged. The goods 6 are conveyed by the oscillating movement of the vibrating conveyor 3.

It is also possible to provide at least one spring 7 connected to the conveying unit 3 in order to support the oscillating movement of the conveying unit 3.

The vibrator 2 comprises an electric vibrator unit 4 and a vibration element 5 that interacts with the vibrator unit 4. The vibration element 5 is connected, usually mechanically, to the conveying unit 3 of the vibrating conveyor 1. The electric vibrator unit 4 causes the vibration element 5 to oscillate when it is supplied with an alternating current (AC) drive voltage $u_v$. Because of the connection between the vibration element 5 and the conveying unit 3, this oscillation is also imposed upon the conveying unit 3. There are different embodiments of an electric vibrator unit 4 possible.

In one advantageous embodiment, the electric vibrator unit 4 is an electromagnetic coil and the vibration element 5 is a magnetic element, as in FIGS. 1 and 2. The magnetic element can be made of any magnetic material, like a ferromagnetic material, for example, or can be a magnet itself, e.g. a permanent magnet or electro magnet. The magnetic element 5 interacts with the electromagnetic filed generated by the electromagnetic coil 4 and moves in response to the electromagnetic field. The vibration element 5 may also be designed as moving core of an electromagnetic coil (as in FIG. 2). When the electromagnetic coil is supplied with an AC drive voltage $u_v$, the vibration element 5 oscillates in response to the electromagnetic field. The frequency of oscillation of the vibration element 5 corresponds to the frequency of the AC drive voltage $u_v$. Therefore, it is possible to adjust the frequency of oscillation of the vibration element 5 by changing the frequency of the AC drive voltage $u_v$.

Figure 3:
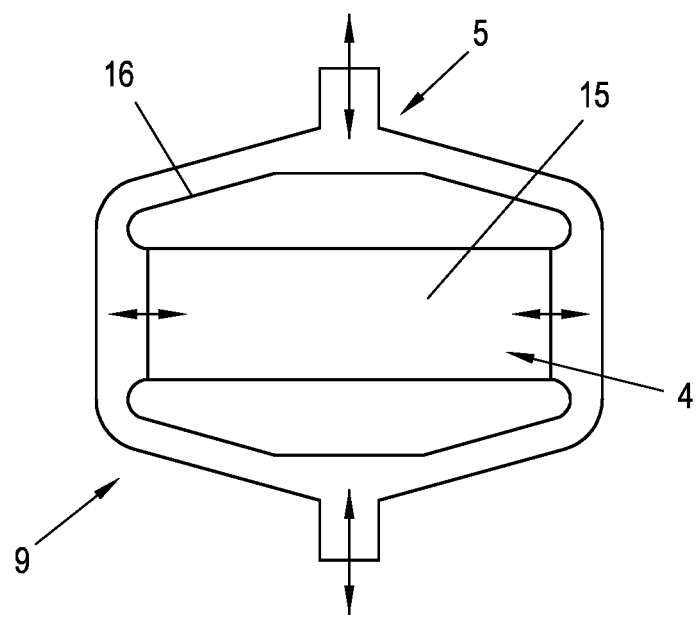
FIG. 3 shows an amplified piezoelectric actuator as vibrator.

In another advantageous embodiment depicted in FIG. 3, the vibrator 2 is a piezoelectric actuator, preferably an amplified piezoelectric actuator 9. Applying an electric AC drive voltage $u_v$ to the piezoelectric actuator causes an oscillating stroke of the piezoelectric element of the piezoelectric actuator. Amplified piezoelectric actuators 9 scale up the very small movements (elongations) of the piezoelectric element 15 to large movements, usually by mechanical transmission 16. FIG. 3 schematically shows an amplified piezoelectric actuator 9. In this embodiment, the mechanical transmission 16 serves as vibration element 5, that is connected to the conveying unit 3 of the vibrating conveyor 1, and the piezoelectric element 15 serves as electric vibrator unit 4. The oscillation of the piezoelectric element 15 corresponds to the frequency of the AC drive voltage $u_v$. This can be the same frequency or a frequency in a fixed relationship to the frequency of the AC drive voltage $u_v$. Therefore, it is possible to adjust the frequency of oscillation of the vibration element 5 by changing the frequency of the AC drive voltage $u_v$.

In general, the frequency $f_0$ of oscillation of the vibration element 5 corresponds to the frequency $f_v$ of the AC drive voltage $u_v$. This can be the same frequency or a frequency in a fixed relationship to the frequency $f_v$ of the AC drive voltage $u_v$. Therefore, it is possible to adjust the frequency $f_0$ of oscillation of the vibration element 5 by changing the frequency $f_v$ of the AC drive voltage $u_v$, in order to match the frequency $f_0$ of oscillation of the vibration element 5 to the mechanical resonance frequency $f_R$ of vibrating conveyor 1. The mechanical resonance frequency $f_R$ of vibrating conveyor 1 is defined by the oscillating parts of the vibrating conveyor 1, i.e., essentially the vibration element 5 and the conveying unit 3 (loaded with goods) and spring(s) 7 (if present) and possibly further oscillating parts of the vibrating conveyor 1.

A controllable electric drive unit 10 is provided that generates the AC drive voltage $u_v$ with a controllable frequency $f_v$. Usually, also the amplitude of the AC drive voltage $u_v$ can be controlled by electric drive unit 10. The electric drive unit 10 can be implemented as controlled power converter, e.g., as frequency converter when the electric drive unit 10 is connected to an AC supply grid 11 or as inverter when it is connected to a DC (direct current) supply grid 11.

Figure 4:
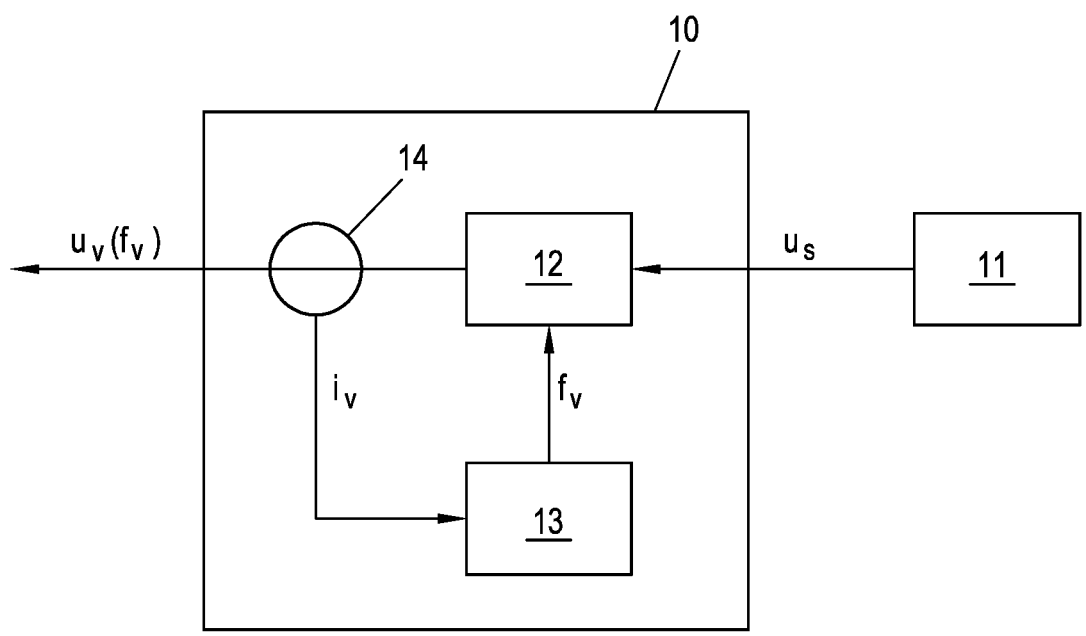
FIG. 4 shows an embodiment of an electric drive unit.

As shown in FIG. 4, the electric drive unit 10 comprises a power electronics unit 12 that converts the supply voltage $u_s$ (AC or DC) from the supply grid 11 into the required AC drive voltage $u_v$ with frequency $f_v$. The power electronics unit 12 is usually an analogue circuit comprising a plurality of semiconductor switches, usually arranged in a number of half bridge circuits. The power electronics unit 12 is controlled by a control unit 13 so that the power electronics unit 12 generates the AC drive voltage $u_v$ with the required frequency $f_v$ and/or amplitude.

The aim of the vibrator 2 is to excite the vibrating conveyor 1, or the oscillating system with the oscillating parts of the vibrating conveyor 1 to be more precise, with or near its mechanical resonance frequency $f_R$ in order to maximise the oscillation amplitude of the conveying unit 3. For that, the oscillation frequency $f_0$ of the vibration element 5 must be tuned to the mechanical resonance frequency $f_R$ of the vibrating conveyor 1. The mechanical resonance frequency $f_R$ of the vibrating conveyor 1 is, however, usually not known and can, furthermore, drift over time. The drift can be caused by mechanical wear in the mechanical parts of the vibrating conveyor, by changing loading of the conveying unit 3 (changing mass), by changing temperature, and so on.

For tuning the oscillation frequency $f_0$ of the vibration element 5 to the mechanical resonance frequency $f_R$ of the vibrating conveyor 1 a current measurement sensor 14 is provided, e.g. in the electric drive unit 10 as in FIG. 4, that measures the AC drive current $i_v$ supplied to the electric vibrator unit 4. By that the electric current consumption of the electric vibrator unit 4 is measured. For determining the mechanical resonance frequency $f_R$, the frequency f of the AC drive voltage $u_v$ is varied, e.g. by a (discrete or analogue) frequency sweep, in a certain frequency range and in doing so the current consumption is measured. This can be done by the control unit 13. The frequency $f_v$ of the AC drive voltage $u_v$ that leads to the lowest current consumption, i.e., to the lowest value of the measured AC drive current $i_v$, corresponds to the mechanical resonance frequency $f_R$. When the vibration element 5 oscillates with the same frequency as the frequency $f_v$ of the AC drive voltage $u_v$, then this frequency $f_v$ equals the mechanical resonance frequency $f_R$. If the vibration element 5 oscillates with a frequency with fixed relationship to the frequency $f_V$ of the AC drive voltage $u_v$, then the mechanical resonance frequency $f_R$ can be determined using the known relationship. It is however, usually not necessary to know the value of the mechanical resonance frequency $f_R$. All that need to be done is to supply the electric vibrator unit 4 of the vibrator 2 with an AC drive voltage $u_v$ with this frequency $f_v$. This ensures that the vibrating conveyor 1 is excited with its mechanical resonance frequency $f_R$.

The range in which the frequency $f_v$ of the AC drive voltage $u_v$ is varied, e.g., by the control unit 13, for tuning the oscillation to resonance can be predefined or can be set. The frequency $f_v$ can be varied in sufficiently small increments, e.g. in increments of 0.5 Hz or 1 Hz, or smaller, or also continuously. For a vibrating conveyor 1 with a known nominal mechanical resonance frequency $f_R$ of 100 Hz, a frequency sweep between 95 Hz and 105 Hz could be set, for example.

For tuning the vibrating conveyor 1 to resonance, the control unit 13 may generate AC drive voltages $u_v$ with different frequencies $f_v$ that are supplied to the electric vibrator unit 4. The current consumption in form of the AC drive currents $i_v$ for each of these AC drive voltages $u_v$ is measured using the current measurement sensor 14. The control unit 13 collects the measured AC drive currents $i_v$.

The frequency $f_v$ that corresponds to the lowest value of the measured AC drive current $i_v$ is used to drive the electric vibrator unit 4.

The control unit 13 may be designed as microprocessor-based hardware that runs certain software (that implements the tuning and control function) installed on the hardware. The control unit 13 may, however, also be implemented as programmable logic controller (PLC) or integrated circuit (IC), like an application-specific integrated circuit (ASIC) or field-programmable gate array (FPGA). Also, an implementation as analogue circuit or analogue computer is conceivable. Combinations of such hardware devices and circuits are also possible.

Tuning the AC drive voltage $u_v$, or its frequency $f_v$ to be more precise, to the actual mechanical resonance frequency $f_R$ of the vibrating conveyor 1 can be repeated regularly or when needed to adapt for a possible drift of the mechanical resonance frequency $f_R$. This can be done fully automatically without any trained personnel involved.

The amplitude of the AC drive voltage $u_v$ can be pre-set or can be set during setup of the vibrating conveyor 1, and may also be changed if need be.

A drift of the mechanical resonance frequency $f_R$ may be detected by monitoring the current consumption of the electric vibrator unit 4. When the deviation of a measured actual AC drive current $i_v$ and a known or given expected current flow (which can be the one with the lowest value in the tuning step) becomes to big then a re-tuning of the frequency $f_v$ of the AC drive voltage $u_v$ of the vibrating conveyor 1 can be requested. To this end, an admissible current difference can be set or can be given and re-tuning is initiated when the deviation exceeds this given admissible current difference. For re-tuning, the above steps for finding the frequency $f_v$ that leads to resonance may be repeated. To re-tune the vibrating conveyor 1, it is also possible to simply adjust the frequency $f_v$ slightly, e.g. by a given frequency increment, to better approach the resonance frequency $f_R$. For small deviations an adjustment of the frequency $f_v$ with a given frequency increment can be chosen, and for bigger deviations a re-tuning can be requested. The values of such "small" and/or "bigger" deviations can be pre-set in the control unit 13 or may also be set before starting operation or during operation of the vibrating conveyor 1.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for controlling the oscillation of a vibrating conveyor, the vibrating conveyor including a vibration element, an oscillation conveyor coupled to the vibration element, and an electric vibrator arranged to vibrate the vibration element, the method comprising:
    supplying the electric vibrator with an AC drive voltage having an initial frequency;
    tuning the initial frequency of the AC drive voltage to an unknown mechanical resonance frequency of the vibrating conveyor;
    wherein the tuning of the initial frequency of the AC drive voltage to the unknown mechanical resonance frequency of the vibrating conveyor comprises:
        varying the initial frequency of the AC drive voltage in a given frequency range,
        measuring an electric current consumption of the electric vibrator for different frequencies within the given frequency range, and
        using one of the different frequencies within the given frequency range with the lowest electric current consumption of the electric vibrator as a tuned frequency of the AC drive voltage for operating the vibrating conveyor.

2. The method according to claim 1, wherein the given frequency range comprises a number of given frequency increments.

3. The method according to claim 1, further comprising initiating a re-tuning of the tuned frequency of the AC drive voltage one of regularly or when a deviation of an actual AC drive current and a given expected current flow exceeds a given admissible current difference.

4. The method according to claim 3, wherein for re-tuning of the tuned frequency of the AC drive voltage comprises:
    varying the tuned frequency of the AC drive voltage in the given frequency range,
    measuring the electric current consumption of the electric vibrator for the different frequencies within the given frequency range, and
    using one of the frequencies within the given frequency range with the lowest current consumption of the electric vibrator as a re-tuned frequency of the AC drive voltage for operating the vibrating conveyor.

5. The method according to claim 3, wherein the given frequency range comprises a number of given frequency increments, and the re-tuning of the frequency of the AC drive voltage is changed by one of the given frequency increments.

6. A vibrating conveyor comprising:
    a vibration element;
    a conveying unit coupled to the vibration unit;
    an electric vibrator arranged to drive the vibration element, which oscillates the conveying unit; and
    an electric drive, which comprises a current measurement sensor, the electric drive being supplied with a supply voltage from a supply grid and being arranged to supply the electric vibrator with an AC drive voltage with a frequency tuned to an unknown mechanical resonance frequency for oscillating the conveying unit,
    wherein the electric drive is structured to supply the electric vibrator with the AC drive voltage with an initial frequency that is tunable to the unknown mechanical resonance frequency of the vibrating conveyor by varying the initial frequency in a given frequency range while the electric drive is supplied with the supply voltage from the supply grid, to measure an electric current consumption of the electric vibrator with the current measurement sensor for the different frequencies in the given frequency range, and to use, as a tuned frequency of the AC drive voltage, one of the different frequencies with the lowest electric current consumption of the electric vibrator unit for operating the vibrating conveyor.

7. The vibrating conveyor according to claim 6, wherein the electric vibrator comprises an electric coil.

8. The vibrating conveyor according to claim 7, wherein the vibration element comprises one of a moving core of the electric coil or a magnetic element interacting with the electric coil.

9. The vibrating conveyor according to claim 6, wherein the electric vibrator comprises an amplified piezoelectric actuator with a piezoelectric element and a mechanical transmission.

10. The vibrating conveyor according to claim 9, wherein the mechanical transmission is arranged as the vibration element and the piezoelectric element is arranged as electric vibrator.

* * * * *